United States Patent
Zhang et al.

(10) Patent No.: US 8,331,799 B2
(45) Date of Patent: Dec. 11, 2012

(54) NON-FEEDBACK PRE-ENCODER FOR OPTICAL DQPSK MODULATION

(75) Inventors: Lumin Zhang, Shanghai (CN); Yi Dong, Shanghai (CN); Weisheng Hu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 676 days.

(21) Appl. No.: 12/547,750

(22) Filed: Aug. 26, 2009

(65) Prior Publication Data

US 2010/0172655 A1 Jul. 8, 2010

(30) Foreign Application Priority Data

Jan. 8, 2009 (CN) .......................... 2009 1 0045049

(51) Int. Cl.
*H04B 10/04* (2006.01)
*H04B 10/12* (2006.01)
*H04L 27/20* (2006.01)

(52) U.S. Cl. ........................ 398/188; 375/308
(58) Field of Classification Search .................. 398/188; 375/308
See application file for complete search history.

(56) References Cited

U.S. PATENT DOCUMENTS

| | | | |
|---|---|---|---|
| 7,327,961 B2 | 2/2008 | Griffin | |
| 7,428,692 B2 * | 9/2008 | Konishi et al. | 714/772 |
| 2005/0074245 A1 | 4/2005 | Griffin | |
| 2006/0193399 A1 * | 8/2006 | Katagiri et al. | 375/308 |
| 2007/0009269 A1 * | 1/2007 | Zitelli | 398/188 |
| 2009/0147896 A1 | 6/2009 | Frankel et al. | 375/354 |

FOREIGN PATENT DOCUMENTS

| | | |
|---|---|---|
| CN | 1874199 | 12/2006 |
| CN | 101313496 | 11/2008 |
| EP | 1526665 | 4/2005 |
| EP | 1760912 | 3/2007 |
| WO | 2005/069490 A1 | 7/2005 |

OTHER PUBLICATIONS

Ying, Chen, Zhang, Bo, and Yang, Jian-feng, "New Multilevel Continuous Phase Modulation Scheme", Journal of University of Electronic Science and Technology of China, vol. 37, No. 4 Jul. 2008, pp. 1-4.

* cited by examiner

*Primary Examiner* — Nathan Curs
(74) *Attorney, Agent, or Firm* — Workman Nydegger

(57) ABSTRACT

A non-feedback pre-encoder for optical DQPSK modulation includes four differential encoders, two power splitters, two delay lines, one exclusive OR gate and a cross switch. Each of two data streams input to the pre-encoder is divided into two identical streams by one of the power splitter, called an upper stream and a lower stream, respectively. Every upper stream is differentially encoded by one of the differential encoders, and outputs of the differential encoders are fed into the XOR gate. An output of the XOR gate drives the cross switch as a control signal. Two lower input data stream are delayed in the delay lines, and fed into the cross switch. The outputs of the cross switch are differentially encoded, separately, where outputs of the pre-encoder are provided. The invention eliminates the speed limitation due to the electrical propagation by constructing an all-forward control signal.

3 Claims, 4 Drawing Sheets

NON-FEEDBACK PRE-ENCODER FOR OPTICAL DQPSK MODULATION

FIELD OF THE INVENTION

This invention relates to optical communication systems, more specifically, to an apparatus and method for pre-encoding the data in optical Differential Quadrature Phase Shift Keying modulation.

BACKGROUND OF THE INVENTION

As the rapid growth of transmission speed in optical communication systems, advanced modulation formats such as Duo-Binary, Carrier Suppressed Return to Zero (CSRZ), Differential Phase Shift Keying (DPSK) and Differential Quadrature Phase Shift Keying (DQPSK), have attracted a wide attention and have been gradually adopted in the systems. In optical DQPSK modulation, two bits of the incoming data are modulated on the carrier by shifting the phase for a multiple of $\pi/2$ in a time interval T (also called a symbol). Four possible shifts between the predecessor and successor symbols are determined by four possible combinations of the two bits data. In each symbol, information of two bits is transmitted. Therefore the spectrum efficiency is doubled, the device bandwidth is halved, and the tolerances of chromatic dispersion (CD) and polarization mode dispersion (PMD) are relaxed. DQPSK is considered as one of the most promising modulation formats for the future high speed optical communication systems.

In an optical DQPSK modulator, two Mach-Zender Modulators are incorporated in parallel to shift the phase of the optical carrier. Two driving signals are amplified to $2V\pi$ and biased at the transmission null. With an additional phase shift of $\pi/2$ in the quadrature (Q) branch, the recombined optical signal of the in-phase (I) branch and Q branch is modulated to four possible phase stages. Because of the differential nature of the DQPSK modulation, a pre-encoder is required to provide a direct map between random data and the driving signals. In a conventional pre-encoder, the output signals are fed back to complete a logic decision, which limits the bit rate due to the electronic propagation delay. The implementation of a simple and feasible pre-encoder is of vital importance in the commercial application of optical DQPSK.

U.S. Pat. No. 7,327,961B2 discloses a technique which achieves a higher speed by multiplexing several low-speed pre-encoders in parallel. Each of the low-speed pre-encoder is implemented according to the conventional circuit arrangement with the feedback loop. The multiplexing relaxes the delay restriction to some extent, but introduces additional concerns such as data synchronization.

It's also proposed a circuit arrangement for a serial optical DPQSK modulator in an international application WO2005069490A1. One Mach-Zender Modulator and one Phase Modulator are cascaded comprised to shift the phase of the optical carrier. The Phase Modulator shifts the carrier phase by either $\pi/4$ or 0, which requires precise amplitude control of the driving signal. In practical implementation, the serial modulation scheme is less adopted compared with parallel modulation.

SUMMARY OF THE INVENTION

To address the above discussed drawbacks of the prior arts, the present invention seeks to provide a new design of the pre-encoder for a parallel optical DQPSK modulation. The invention introduces an alternative for the feedback control signal constructed by the forward logic combination of two input signals, therefore eliminates the delay constrain in the high-speed DQPSK pre-encoder.

In one embodiment, a pre-encoder includes four differential encoders, two power splitter, two delay lines, one exclusive OR (XOR) gate and a cross switch. Each of two data streams input to the pre-encoder is divided into two identical streams by one of the power splitter, called an upper stream and a lower stream, respectively. Every upper stream is differentially encoded by one of the differential encoder, and outputs of the differential encoders are fed into the XOR gate. The output of the XOR gate drives the cross switch as a control signal. The two lower input data stream are separately delayed in two delay lines, then fed into the cross switch. The outputs of the cross switch are differentially encoded, separately, where the outputs of the pre-encoder are provided.

In the preferred embodiment, the cross switch includes two data inputs, two corresponding data outputs and a control signal input. The data inputs and data outputs are directly connected when the control voltage is logic low, while the high logic level of the control signal indicates the cross connection between the inputs and outputs.

The foregoing has outlined, rather broadly, preferred features of the present invention so that those who skilled in the art may better understand the detailed description of the invention that follows. Those who skilled in the art should appreciate that they can readily use the disclosed conception and specific embodiment as a basis for designing or modifying other structures for carrying out the same purpose of the present invention. Those who skilled in the art should also realize that such equivalent constructions do not depart from the spirit and scope of the invention in its broadest form.

BRIEF DESCRIPTION OF THE DRAWINGS

The invention is explained below with a more detailed description in conjunction with the accompanying drawings, in which.

DETAILED DESCRIPTION OF THE INVENTION

Figure 1:
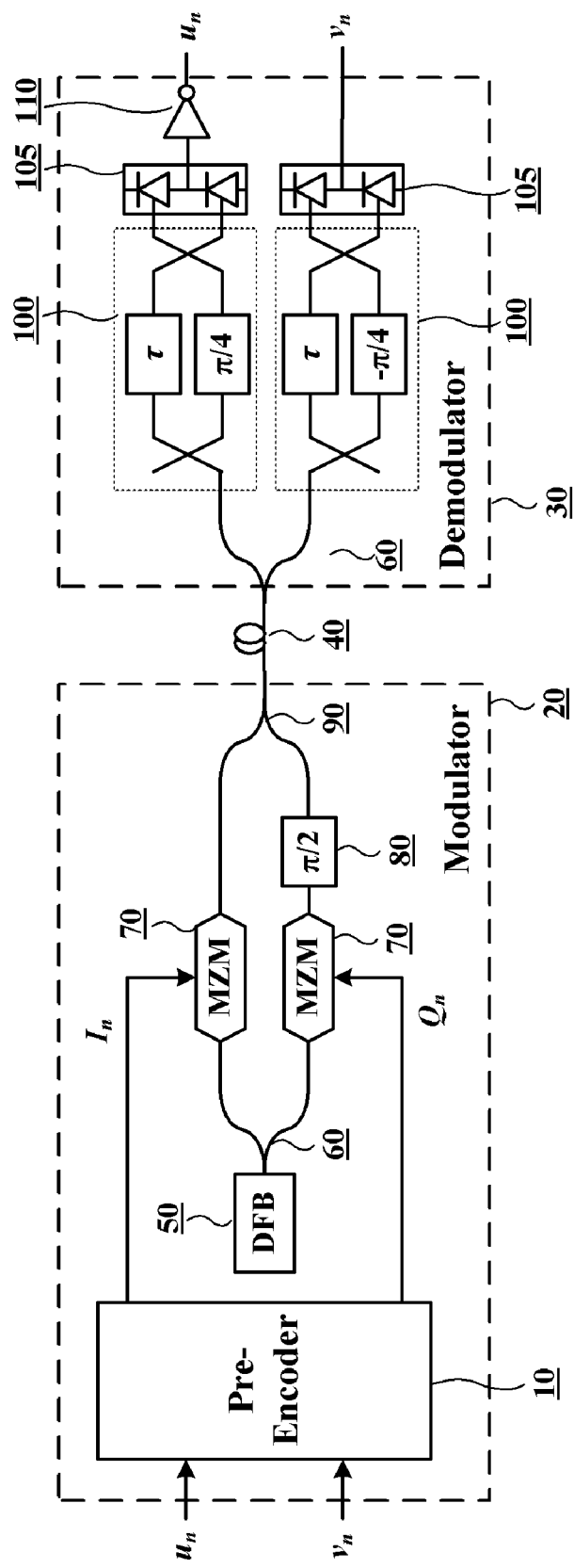
FIG. 1 illustrates an exemplary embodiment of the optical DQPSK transmission system.
Figure 2A:
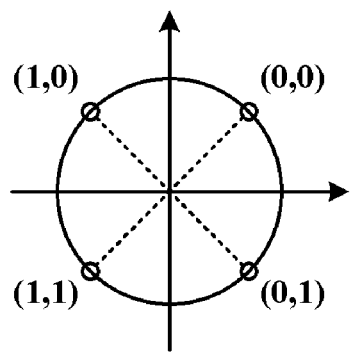
FIGS. 2A and 2B are the constellation diagrams of the optical DQPSK modulator and demodulator.

Referring to FIG. 1, it's illustrated an embodiment of optical DQPSK transmission system, including a modulator (20), a demodulator (30) and transmission fiber (40). The light generated by a continuous wave laser (50), preferably being implemented by a distributed feedback laser (DFB) due to the stability, is divided into two separate branches, named I branch and Q branch, by a 1×2 optical coupler (60). Light in each branch is modulated by a Mach-Zender Modulator (MZM) (70) as a (0, $\pi$) phase modulator respectively. The MZM driving signals generated by a pre-encoder (10) are biased at the transmission null and amplified to $2V_\pi$ for the peak to peak amplitude, in which a logic high signal shifts the phase of the optical carrier by $\pi$. With an additional fixed phase shift of π/2 in the Q branch, two optical carriers are recombined by an optical 2×1 coupler (90) to generate the optical DQPSK signal. Four possible statements of the driving signals $I_n$, $Q_n$ and the resulting phase shift of the optical carrier are tabulated in Table 1. The corresponding constellation diagram is illustrated in FIG. 2A.

TABLE 1

Values of driving signal $I_n$, $Q_n$, and the optical carrier phase shift $\psi_n$ in the optical DQPSK modulator

| $I_n$ | $Q_n$ | $\psi_n$ |
|---|---|---|
| 0 | 0 | π/4 |
| 1 | 0 | 3π/4 |
| 1 | 1 | 5π/4 |
| 0 | 1 | 7π/4 |

Figure 2B:
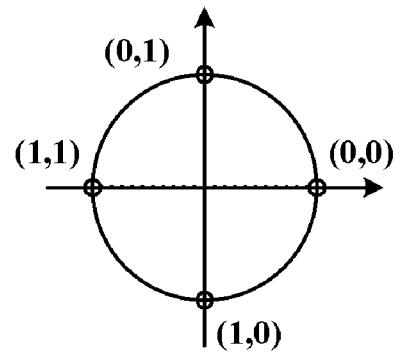

An optical DQPSK demodulator includes a 1×2 optical coupler (60), two Mach-Zender Delay Interferometers (MZDI) (100), two balanced detectors (105) and a NOT gate (110). The optical signal is equally divided into two parts. Each is processed by an MZDI (100) and detected by a balance detector (105). The phase difference between the two arms in MZDI is π/4 for the upper branch and −π/4 for the lower branch, respectively. The relationship between demodulator outputs and the difference in phase shift between the neighboring symbols of the optical DQPSK signal is tabulated in Table 2. The corresponding constellation diagram is illustrated in FIG. 2B.

TABLE 2

Values of demodulator outputs $u_n$, $v_n$, and the difference in optical carrier phase shift $\Delta\psi_n$ in the optical DQPSK demodulator

| $\Delta\psi_n$ | $u_n$ | $v_n$ |
|---|---|---|
| 0 | 0 | 0 |
| π/2 | 1 | 0 |
| π | 1 | 1 |
| 3π/2 | 0 | 1 |

The pre-encoder (10) in the optical DQPSK modulation is functioned to provide a direct map between the demodulated signals $u_n$, $v_n$ and the driving signals $I_n$, $Q_n$. According to the phase shift relationships, the derived logical equation of driving signals $I_n$, $Q_n$ is:

$$I_n = \overline{(I_{n-1} \oplus Q_{n-1})}(I_{n-1} \oplus u_n) + (I_{n-1} \oplus Q_{n-1})(I_{n-1} \oplus v_n)$$

$$Q_n = \overline{(I_{n-1} \oplus Q_{n-1})}(Q_{n-1} \oplus v_n) + (I_{n-1} \oplus Q_{n-1})(Q_{n-1} \oplus u_n)$$

where $u_n$ and $v_n$ indicate the demodulated signals as well as the input data streams of the pre-encoder, $I_{n-1}$ and $Q_{n-1}$ are 1-bit delayed version of the driving signals, and the symbol $\oplus$ represents exclusive OR logic calculation.

The differential encoding can be implemented by performing an XOR operation between the 1-bit delayed version of the output and the input. In this way, the equations above can be interpreted in a simple logic. Assuming $(I_{n-1} \oplus Q_{n-1})$ is the control signal, when the control signal is logic high, $I_n$ is a differential encoded output corresponding to the input of $u_n$ while $Q_n$ is the differential encoded output corresponding to the input of $v_n$; when the control signal is logic low, the inputs of the differential encoders are exchanged.

Figure 3:
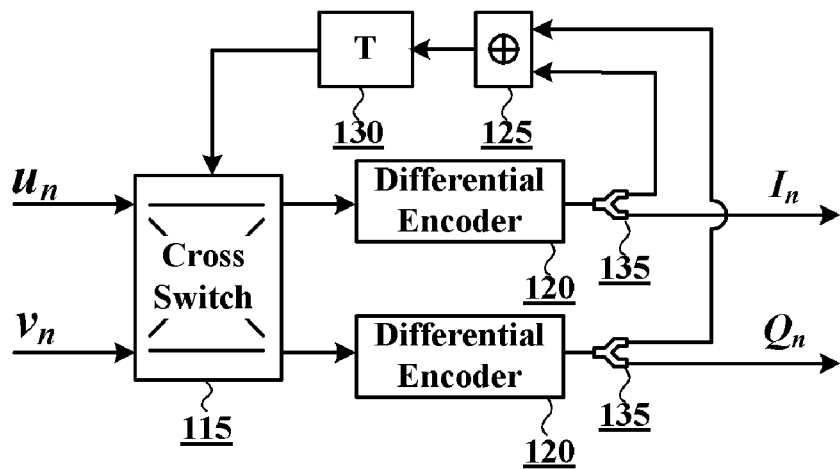
FIG. 3 illustrates the conventional optical DQPSK pre-encoder arrangement.

The conventional circuit arrangement of the pre-encoder is a direct implementation of the logic relationship explained above, referring to FIG. 3. The circuit arrangement incorporates two inputs $u_n$, $v_n$, connecting to the two inputs of the cross switch (115). The outputs of the cross switch are connected to two differential encoders (120). The outputs of the differential encoder are divided into two streams by two power splitters (135), respectively. One of the outputs of each power splitter provides the pre-encoder outputs; the other is fed to an XOR gate (125). After passing through a delay line, the output of the XOR gate drives the cross switch as a control signal. The length of the delay line is determined by the propagation delay and the encoding data rate, it's required that the overall delay in the feedback loop equals to the time interval of the encoding data. To ensure the correct function, the time interval of the encoding data should be larger than the inevitable propagation delay in the feedback circuit, including that of a cross switch, a differential encoder, an XOR gate and their interconnections. Therefore, the bit rate of the encoding data is limited, and can hardly meet the requirement of a high speed optical DQPSK modulation.

Figure 4:
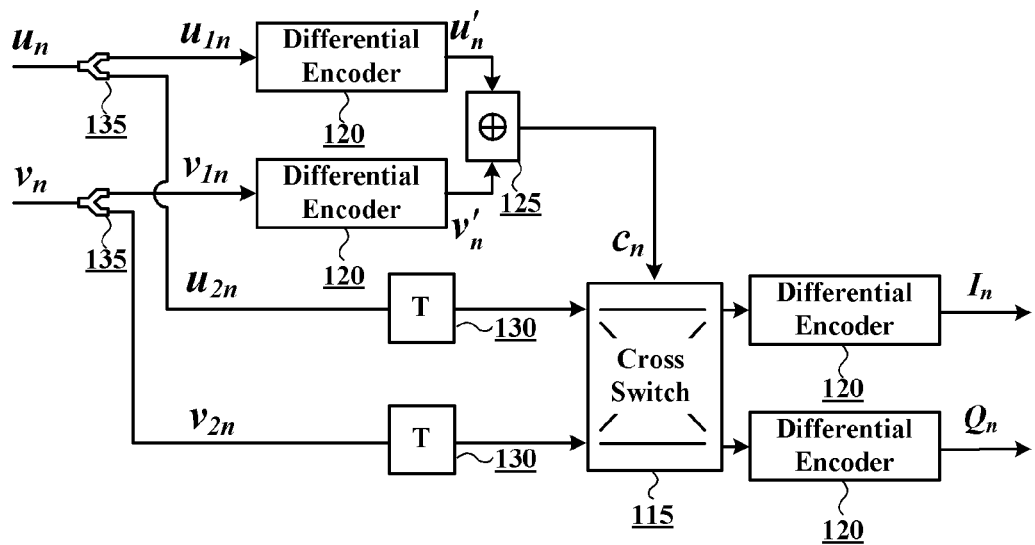
FIG. 4 illustrates a preferred embodiment of the present invention.

Referring to FIG. 4, a preferred embodiment of the present invention includes two power splitters (135), four differential encoders (120), an XOR gate (125), two delay lines (130) and a cross switch (115). It also incorporates two inputs $u_n$, $v_n$ and two outputs $I_n$, $Q_n$. Each of the data streams input to the pre-encoder is equally divided into two identical streams by a power splitter (135). Each upper stream (i.e. $u_{1n}$, $v_{1n}$) is encoded by a differential encoder (120). The encoded streams $u'_n$, $v'_n$ are fed into the XOR gate (125). The output of the XOR gate drives the cross switch (115) as a control signal. After proper delay in two delay lines (130), the lower input streams $u_{2n}$, $v_{2n}$ are connected to the inputs of the cross switch. The delay line is designed to compensate the propagation delay of the control signal, so as to ensure that the control signal is one bit later than its corresponding data streams. Outputs of the cross switch are differential encoded separately by the other two differential encoders (120), where the outputs of the pre-encoder $I_n$, $Q_n$ are generated.

Figure 5:
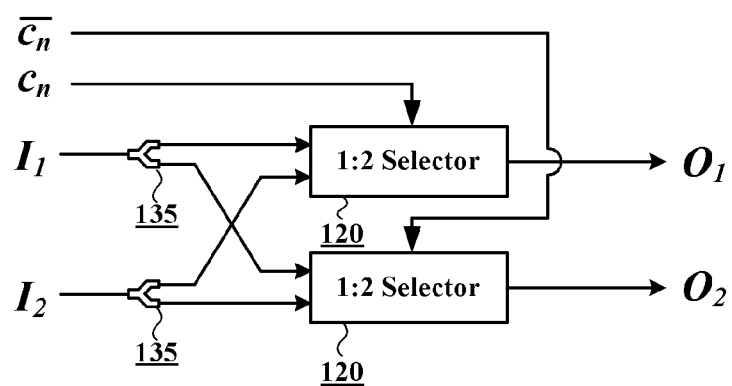
FIG. 5 illustrates a preferred embodiment of the circuit arrangement of the cross switch.

Referring to FIG. 5, a preferred embodiment of the circuit arrangement of the cross switch includes two 1:2 selectors (140) and two power splitters (135). It also incorporates two data inputs, two corresponding data outputs and a control signal input. The data inputs and outputs are single ended while the control signal is differential. The two inputs $I_1$, $I_2$ are equally divided into two identical streams by the power splitters (135), and each group of two different streams are fed into one 2:1 selector (140). The positive port of the control signal is connected to the control port of the first 2:1 selector while the negative port is connected to that of the second 2:1 selector. The outputs $O_1$, $O_2$ are provided by the outputs of the selectors. In this arrangement, when the control signal is logic high, $O_1$ is connected to $I_1$ and $O_2$ is connected to $I_2$; when the control signal is logic low, the outputs are crosswise connected to the inputs.

In the preferred embodiment, the control signal of the cross switch is the result of the XOR operation between $u'_n$ and $v'_n$, the differential encoded signals of the input data streams are as follow:

$$u'_n = u_n \oplus u'_{n-1}$$

$$v'_n = v_n \oplus v'_{n-1}$$

where $u'_{n-1}$ and $v'_{n-1}$ represent 1-bit delayed version of the differential encoded streams $u'_n$, $v'_n$, respectively.

The control signal can be represented according to the logic equation:

$$c_n = (u'_n \oplus v'_n) = (u_n \oplus v_n) \oplus (u'_{n-1} \oplus v'_{n-1})$$

In a conventional circuit arrangement of the pre-encoder, the control signal is provided by the XOR operation between two data outputs:

$$c_n = I_n \oplus Q_n = (u_n \oplus v_n) \oplus (I_{n-1} \oplus Q_{n-1})$$

It can be observed that the two equations are the same in logic relationships; therefore, the conventional feedback control signal can be substituted by the proposed all-forward one in the present invention. The electrical propagation constrain is eliminated at the cost of two additional differential encoders.

Figure 6:
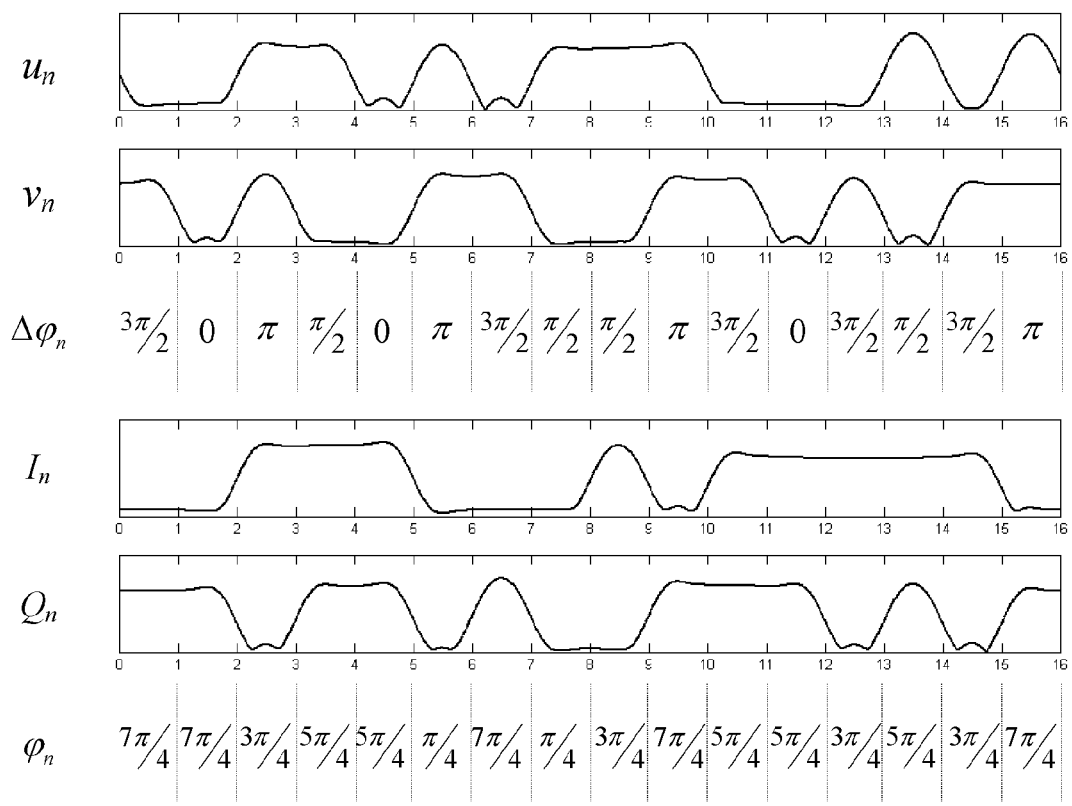
FIG. 6 shows simulated output data streams of the pre-encoder in accordance with the random selected input data streams.

The simulated data outputs of the pre-encoder in accordance with the random selected input data streams are shown in FIG. 6. Where, $u_n$, $v_n$ are the input data streams; $\psi_n$ is the corresponding difference between output data streams; $I_n$, $Q_n$ are the output data streams, and $\Delta\psi_n$ represents the optical carrier phase shifts. From the simulation result, the optical carrier phase shift and the corresponding phase difference between the neighboring symbols are:

$$\psi_n = \psi_{n-1} + \Delta\psi_n$$

Where $\Delta\psi_{n-1}$ represents the 1-bit delayed version of the phase shift $\Delta\psi_n$. The simulated data meets the requirement of a pre-encoder in the optical DQPSK modulation.

What is claimed is:

1. A non-feedback pre-encoder for optical DQPSK modulation, comprising four differential encoders, two power splitters, two delay lines, one exclusive OR (XOR) gate and a cross switch, wherein, each of two data streams input to the pre-encoder is divided into two identical streams by one of the power splitters, called an upper stream and a lower stream, respectively;

each upper stream is differentially encoded by a respective one of the differential encoders, and outputs of the differential encoders are fed into the XOR gate;

an output of the XOR gate drives the cross switch as a control signal;

the two lower streams are delayed separately in respective delay lines, and fed into the cross switch;

outputs of the cross switch are differentially encoded, separately, where outputs of the pre-encoder are provided.

2. The non-feedback pre-encoder for optical DQPSK modulation according to claim 1, wherein, the cross switch comprises two data inputs, two corresponding data outputs and a control signal input; the data inputs and the data outputs are directly connected when a control voltage is logic low, while a high logic level of the control signal indicates a cross connection between the inputs and outputs.

3. The non-feedback pre-encoder for optical DQPSK modulation according to claim 2, wherein, the cross switch comprises two power splitters and two 2:1 selectors;

each of two input data streams input to the cross switch is divided into two identical streams and each group of two different streams are fed into a respective one of the 2:1 selectors;

a positive port of the control signal is connected to a first selector and a negative port is connected to a second selector.

* * * * *